(12) United States Patent
Zatvornytskyi et al.

(10) Patent No.: US 12,555,383 B2
(45) Date of Patent: Feb. 17, 2026

(54) VIDEO SURVEILLANCE SYSTEM FOR CAMERA-RICH AREAS

(71) Applicant: MILESTONE SYSTEMS A/S, Brøndby (DK)

(72) Inventors: Oleksii Zatvornytskyi, Brøndby (DK); Peter Posselt Vergmann, Brøndby (DK)

(73) Assignee: MILESTONE SYSTEMS A/S, Brøndby (DK)

( * ) Notice: Subject to any disclaimer, the term of this patent is extended or adjusted under 35 U.S.C. 154(b) by 0 days.

(21) Appl. No.: 18/434,040

(22) Filed: Feb. 6, 2024

(65) Prior Publication Data

US 2025/0252744 A1   Aug. 7, 2025

(30) Foreign Application Priority Data

Feb. 7, 2023   (GB) ..................... 2301677

(51) Int. Cl.
*G06V 20/52*   (2022.01)
*G06V 10/56*   (2022.01)

(52) U.S. Cl.
CPC ............. *G06V 20/52* (2022.01); *G06V 10/56* (2022.01); *G06V 2201/07* (2022.01)

(58) Field of Classification Search
CPC ..... G06V 20/52; G06V 10/56; G06V 2201/07
See application file for complete search history.

(56) References Cited

U.S. PATENT DOCUMENTS

2004/0223191 A1\* 11/2004 Murata .................. H04N 7/181
  348/E7.086
2004/0257444 A1  12/2004 Maruya
2008/0088706 A1\* 4/2008 Girgensohn ........... H04N 7/181
  348/207.99
2009/0079831 A1\* 3/2009 Sethuraman ..... G08B 13/19645
  348/222.1
2013/0106993 A1\* 5/2013 Schofield ............... B60Q 9/008
  348/148
2014/0055616 A1\* 2/2014 Corcoran ............... H04N 23/69
  348/148
2014/0152836 A1  6/2014 Morris
2016/0165187 A1\* 6/2016 Rasheed ................. G06F 18/28
  348/143

(Continued)

FOREIGN PATENT DOCUMENTS

EP   4075796 A1   10/2022

*Primary Examiner* — Jared Walker
(74) *Attorney, Agent, or Firm* — Canon U.S.A., Inc. IP Division (57) ABSTRACT

A video surveillance system including a movable video camera, a plurality of stationary video cameras, wherein the movable video camera is geographically dynamic while recording or streaming video, and a video management system comprising a processing unit, and a user screen or display comprising a user interface window. The processing unit is configured to determine a geographical position and a time instant of the movable video camera, and respective geographical positions of the plurality of stationary video cameras, select a subset of stationary video cameras arranged nearby the movable video camera, present a video stream of the movable video camera in a primary tile, present the respective video streams of the subset of stationary video cameras in respective secondary tiles of the user interface window.

13 Claims, 5 Drawing Sheets

(56) References Cited

U.S. PATENT DOCUMENTS

| | | | |
|---|---|---|---|
| 2019/0313119 A1* | 10/2019 | Han | H04N 19/174 |
| 2020/0413001 A1* | 12/2020 | Takahashi | H04N 5/77 |
| 2021/0092470 A1* | 3/2021 | Kawakami | H04N 21/472 |
| 2021/0125640 A1* | 4/2021 | Andersson | H04N 23/695 |
| 2022/0030178 A1* | 1/2022 | Nagata | H04N 5/2628 |
| 2022/0353455 A1* | 11/2022 | Kleinrock | H04N 23/661 |
| 2023/0125724 A1* | 4/2023 | Kristiansen | G06V 20/52 |
| | | | 348/143 |

* cited by examiner

VIDEO SURVEILLANCE SYSTEM FOR CAMERA-RICH AREAS

CROSS REFERENCE

This application claims the benefit under 35 U.S.C 119 (a)-(d) of the United kingdom Patent Application No. 2301677.7, filed on Feb. 7, 2023, and titled "VIDEO SURVEILLANCE SYSTEM FOR CAMERA-RICH AREAS"; this cited patent application is incorporated herein by reference in its entirety.

TECHNICAL FIELD

The present disclosure generally relates to video surveillance systems, video management systems and optionally computer-implemented video management methods for video surveillance systems.

BACKGROUND

Modern video surveillance systems have evolved into highly complex and often heterogeneous systems comprising a large number of different peripheral devices and computer hardware elements that are tied together via a networked infrastructure, and controlled by means of advanced management software. One important component of modern video surveillance systems is a video recording and processing system that allows video streams from one or more video cameras to be received, stored and processed.

A video management system (VMS), also known as video management software or a video management server, is a component or sub-system of a video surveillance system. The VMS typically provides various video management services, such as one or more of the following: collecting one or more video streams from one or more video cameras, storing the received one or more video streams to a storage device and providing an interface to view the received one or more live video streams and/or to access one or more stored video streams.

Moreover, it is generally desirable that surveillance systems and, in particular, VMSs are versatile and can be used in different types of applications which may impose different demands or requirements to processing and displaying received video streams supplied by the one or more video cameras. Moreover, the demands and requirements imposed in a surveillance system may change over time.

A particular challenge to video surveillance systems and the VMS subsystem is to handle and display video streams supplied by a mix of stationary video cameras and moving or movable, i.e. non-stationary, video cameras in a meaningful and intuitive manner to a user e.g. a VMS operator.

SUMMARY

The present disclosure relates to innovative layouts of user interface windows of VMS subsystems. The innovative layouts of user interface windows inter alia address and solve the above-outlined challenges by providing meaningful and intuitive display of live or retrieved video streams supplied by a mix of movable video cameras and stationary video cameras.

A first aspect of the present disclosure relates to a video surveillance system comprising a movable video camera and a plurality of stationary video cameras arranged in a surveillance area. The plurality of stationary video cameras are configured to generate respective video streams and respective associated metadata streams. The video surveillance system further comprises a video management system which comprises: a processing unit configured to receive the respective video streams and associated metadata streams via a data communication interface, a user screen or display comprising a user interface window (UIW) configured to present the respective video streams of the movable video camera and the plurality of stationary video cameras.

The processing unit is further configured to:
determine a geographical position and a time instant or time period of the movable video camera (for example corresponding to a search result),
determine respective geographical positions of the plurality of stationary video cameras,
select a subset of stationary video cameras, from the plurality of stationary video cameras, arranged nearby the movable video camera at the time instant or time period,
present a video stream of the movable video camera corresponding to the time instant or time period in a primary tile of the user interface window,
present the respective video streams, at the time instant or period, of the subset of stationary video cameras in respective secondary tiles of the user interface window wherein the position of each secondary tile relative to the primary tile reflects a relative aiming of the fields of view of the corresponding stationary video camera and the movable video camera.

The skilled person will understand that a "nearby" stationary video camera means within a useful viewing distance of the movable video camera at the time instant. The distance limit may be selected by the user or automatically depending on environmental conditions at the time instant, such as light, rain and fog conditions.

The distance between the stationary video camera in question and the movable video camera that qualifies as "nearby" at the time instant may be less than 100 m such as less than 50 m or 25 m, for example between 20 m and 5 m. That is to say that the nearby video camera may be selected based on distance to the movable camera. The distance may be 100 m or less, preferably 50 m or less, more preferably 20 m or less, or more preferably 5 m or less. Put another way, the subset of stationary cameras are selected from stationary cameras within a selection area of the movable camera. For example, they are selected from stationary cameras in a radius of a 100 meters or less etc.

The processing unit may be further configured to position the primary tile at a center of the UIW and position each secondary tile around the primary tile.

The second tile may be positioned: above the primary tile when the field of view of the corresponding stationary video camera aims substantially in same direction as field of view of the movable video camera; below the primary tile when the field of view of the corresponding stationary video camera aims substantially in opposite direction of field of view of the movable video camera; at the left of the primary tile when the field of view of the corresponding stationary video camera aims substantially to the left of the field of view of the movable video camera; at the right of the primary tile when the field of view of the corresponding stationary video camera aims substantially to the right of the field of view of the movable video camera. Put another way, this layout provides an omnidirectional-like layout to allow the VMS user to understand the situation around the movable cameras in an intuitive manner.

This layout on the UIW creates an immersive environment which improves the user's awareness of the surroundings of the moveable video camera. The surroundings of the moveable video camera may include various types of target objects and/or incidents of interest to the user at a time instant and/or time periods before or after the time instant.

The processing unit may be configured to: arrange each secondary tile of the plurality of secondary tiles adjacent to, and non-overlapping with the primary tile.

The processing unit may be configured to adjust the size of one or more tiles arranged at the same side of the primary tile so to substantially extend along an entire length of the side of the primary tile. This means that the respective sizes of the one or more tiles may be maximized to enhance visibility of the respective video streams of the stationary video cameras in the secondary tiles.

The processing unit may be configured to arrange each secondary tile adjacent to, and non-overlapping with, the primary tile.

The processing unit may be configured to select the subset of stationary video cameras based on at least one condition. The processing unit may be configured to select a movable video camera based on at least one condition, especially if there are a plurality of movable cameras. The selection may be made based on at least one condition selected from smallest distances to the movable video camera, video quality, and video resolution.

Hence, several factors, e.g. conditions, may be in play in addition to the nearby location of the stationary video camera to the movable video camera. In particular, in situations where the subset of nearby stationary video cameras are larger than the number of available secondary tiles at a particular side of the primary tile, the video quality or video resolution of the video cameras may be used as an additional filtering mechanism.

In some embodiments, video quality may be understood to mean criteria which makes a video stream preferable to view by a VMS user, i.e. viewer criteria. For example, the criteria may be based on at least one of: video resolution, latency, video frame rate, compression level, metadata presence (whether the video stream has metadata available, i.e. comprises camera metadata or metadata associated with the camera, or whether metadata is absent), and useful FOV (i.e. the proportion of the FOV which is unobscured by objects such as walls etc.).

Viewer criteria may be preset by a VMS user, i.e. a predefined criteria set by the VMS user. For example, a user may preset their preferred minimum level of video resolution and the minimum video frame rate prior to viewing video streams. The preset criteria may also be dynamically changed by the user, i.e. changed while viewing video streams. A change in criteria may result in the video streams displayed in the secondary tiles being updated because the subset of stationary video cameras is updated.

The VMS can use the criteria to determine preferable video streams, i.e. video stream preferable to the user. Therefore, it is possible for the VMS to better select the subset of nearby stationary video cameras. Considered in another way, it is possible to filter the subset of stationary video cameras nearby the movable camera for preferable video streams to present in the secondary tiles.

The position and time instant of the video stream of the movable video camera may correspond to a search result. The search result may identify at least one of a target object, a target activity and a target incident in the surveillance area in accordance with a user defined search query or an automatically generated search query.

The processing unit may be configured to store the plurality of video streams and associated metadata streams in a video data repository and in a metadata repository, respectively. The processing unit may retrieve the plurality of video streams and associated metadata streams and search these streams for the at least one of a target object, a target activity and a target incident within the surveillance area.

The processing unit may be configured to add one or more visually distinguishing attributes to the primary tile relative to the secondary tiles. The attributes may comprise at least one of a color, such as coloured borders, a size, textual tags and icons.

A second aspect of the present disclosure relates to a computer-implemented video management method for a video surveillance system. The method comprising steps:
  a) receive, at a video management system, a plurality of respective video streams and associated metadata streams supplied by a movable video camera and a plurality of stationary video cameras,
  b) determine a time instant of the movable video camera and determine a corresponding geographical position, where the time instant optionally corresponds to a search result,
  c) determine respective geographical positions of the plurality of stationary video cameras,
  d) determine a subset of stationary video cameras, from the plurality of stationary video cameras, arranged nearby to the movable video camera at the time instant,
  e) generate a primary tile in a user interface window of a user screen and present a video stream of the movable video camera corresponding to the time instant in the primary tile,
  f) generate and position a first secondary tile in the user interface window wherein the position of the first secondary tile relative to the primary tile reflects a reflects a relative aiming of the fields of view of the first stationary video camera and the movable video cameras,
  g) present a video stream of the first stationary video camera corresponding to the time instant in the first secondary tile,
  h) repeat steps f) and g) for each further stationary video camera of the subset of stationary video cameras.

The computer-implemented video management method may comprise an additional step of: i) receive, at the video management system, a user defined search query, or an automatically generated search query, for identifying at least one of a target object, a target activity and a target incident at the time instant and corresponding geographical position of the movable video camera.

A third aspect of the present disclosure relates to a video management system comprising a processing unit storing a plurality of microprocessor executable program instructions configured to at least carry out steps a)-h) of the computer-implemented video management method.

The movable video camera may be a geographically dynamic camera. For example, a body worn camera, a camera attached to a vehicle etc. The movable video camera may be geographically dynamic while recording or streaming video.

The geographical position of the movable video camera may be regularly or continuously determined, i.e. updated. That is to say that the geographical position of the movable video camera may be dynamically tracked, i.e. updated.

The subset of stationary video cameras may be updated based on the geographical position of the moveable video camera. That is to say the selected subset of stationary video cameras may be updated, e.g. changed, to ensure that the subset of stationary video cameras remain nearby to the movable video camera. Put another way, there may be a dynamic determination of stationary video cameras nearby the movable video camera.

The user interface window may be updated based on at least one of the geographical position of the movable video camera and the time instant. The user interface window may be updated based on an update of the subset of stationary video cameras. The user interface window may be updated based on the relative positions of the geographical movable cameras and the geographical positions of the subset of stationary video cameras.

The or each secondary tile in the user interface window may be updated based on the subset of stationary video cameras. For example, when the subset of stationary video cameras is updated, i.e. changes, the secondary tile(s), i.e the video streams within those tiles, may be updated based on the updated subset of stationary video cameras. The secondary tiles may be arranged and displayed as already discussed. For example, by changing which video stream of the stationary video cameras are displayed in what secondary tiles. Updating the layout of the secondary tiles provides a way to ensure that all the relevant video streams are displayed in an intuitive manner as the geographical positions change.

A fourth aspect of the present disclosure relates to a video management system according to the definition thereof in the first aspect of the present disclosure or any other aspect of the present disclosure.

A fifth aspect of the present disclosure may be provided by a video management system comprising one or more processors configured to execute computer readable instruction stored in a memory which when run are configured to:
 a) determine a geographical position of a movable video camera within a surveillance area at a time instant based on received location data, wherein the movable camera is geographically dynamic within the surveillance area while recording or streaming;
 b) select a subset of nearby stationary video cameras from a plurality of stationary video cameras within the surveillance area, wherein the geographical position of each of the stationary video cameras is determined based on location data and the subset of nearby cameras is selected based on a selection factor including proximity to the movable video camera at the time instant;
 c) generate a user interface layout configuration for use in a user interface window on a device, the user interface layout configuration including a primary video tile for the movable camera and a secondary video tile for each stationary video camera within the determined subset of nearby stationary cameras, wherein the video tiles present video streams received from respective video cameras at the time instant, wherein the or each secondary video tile is position relative to the primary tile to reflect a relative aiming of the fields of view of the corresponding stationary video camera within the subset of nearby stationary cameras and the movable video camera;
 d) updating the subset of nearby stationary video cameras when the geographical position and time instant of the moveable camera changes; and
 e) updating the generated user interface layout configuration based on the updated subset of nearby stationary video cameras.

The video management system may further comprise a data communication interface operable to connect to and receive video streams from the movable video camera and the plurality of stationary video cameras. The video management system may be further configured to provide the video stream of the movable camera to the primary video tile and to provide the video stream of each stationary video camera in the subset of nearby stationary video cameras to a secondary video tile.

A sixth aspect of the present disclosure may be provided by a video surveillance system for use with a movable camera and a plurality of stationary video cameras arranged in a surveillance area, wherein the movable camera is geographically dynamic through the surveillance area while recording or streaming video, the video surveillance system comprising a video management system including:
 a data communication interface operably connectable to the movable video camera and/or the stationary video camera(s); and
 a processing unit operably configured to receive the respective video stream(s) via the data communication interface,
 wherein said processing unit is operably configured to:
 determine a geographical position and a time instant of the movable video camera,
 determine geographical positions of the plurality of stationary video cameras,
 select a subset of stationary video cameras, from the plurality of stationary video cameras, arranged nearby the determined geographical position of the movable video camera at the time instant,
 generate a user interface layout configuration for use in a user interface window on a device, the user interface layout configuration including a primary video tile for the movable camera and a secondary video tile for each stationary video camera within the determined subset of nearby stationary cameras, wherein the or each secondary video tile is position relative to the primary tile to reflect a relative aiming of the fields of view of the corresponding stationary video camera within the subset of nearby stationary cameras and the movable video camera,
 provide the video stream of the movable video camera corresponding to the time instant for use in the primary video tile,
 provide the video stream corresponding to the time instant for each stationary video camera in the subset of stationary video cameras for use in the respective secondary video tile,
 updating the subset of nearby stationary video cameras when the geographical position of the moveable camera changes; and
 updating the generated user interface layout configuration based on the updated subset of nearby stationary video cameras and the provided video streams.

Features of the fifth and/or sixth aspects of the present disclosure may be combined or replace features of other aspects of the present disclosure.

A computer-implemented video management method may be provided for the fifth and sixth aspects. This may comprise appropriate process steps apparent from the features of the fifth and/or sixth aspects.

Other aspects of the present disclosure may be provided by a computer program comprising executable instructions which causes a processor to operate as per any of the aspects of the present disclosure. The computer program may be provided on a non-transitory computer readable medium. Put another way, a non-transitory computer readable medium may be provided which comprises a computer program including executable instructions, which when run on a processing unit, causes the computer to perform the aspects of the present disclosure.

BRIEF DESCRIPTION OF THE DRAWINGS

The above and other aspects will be apparent and elucidated from the embodiments described in the following with reference to the drawings in which.

DETAILED DESCRIPTION

Figure 1:
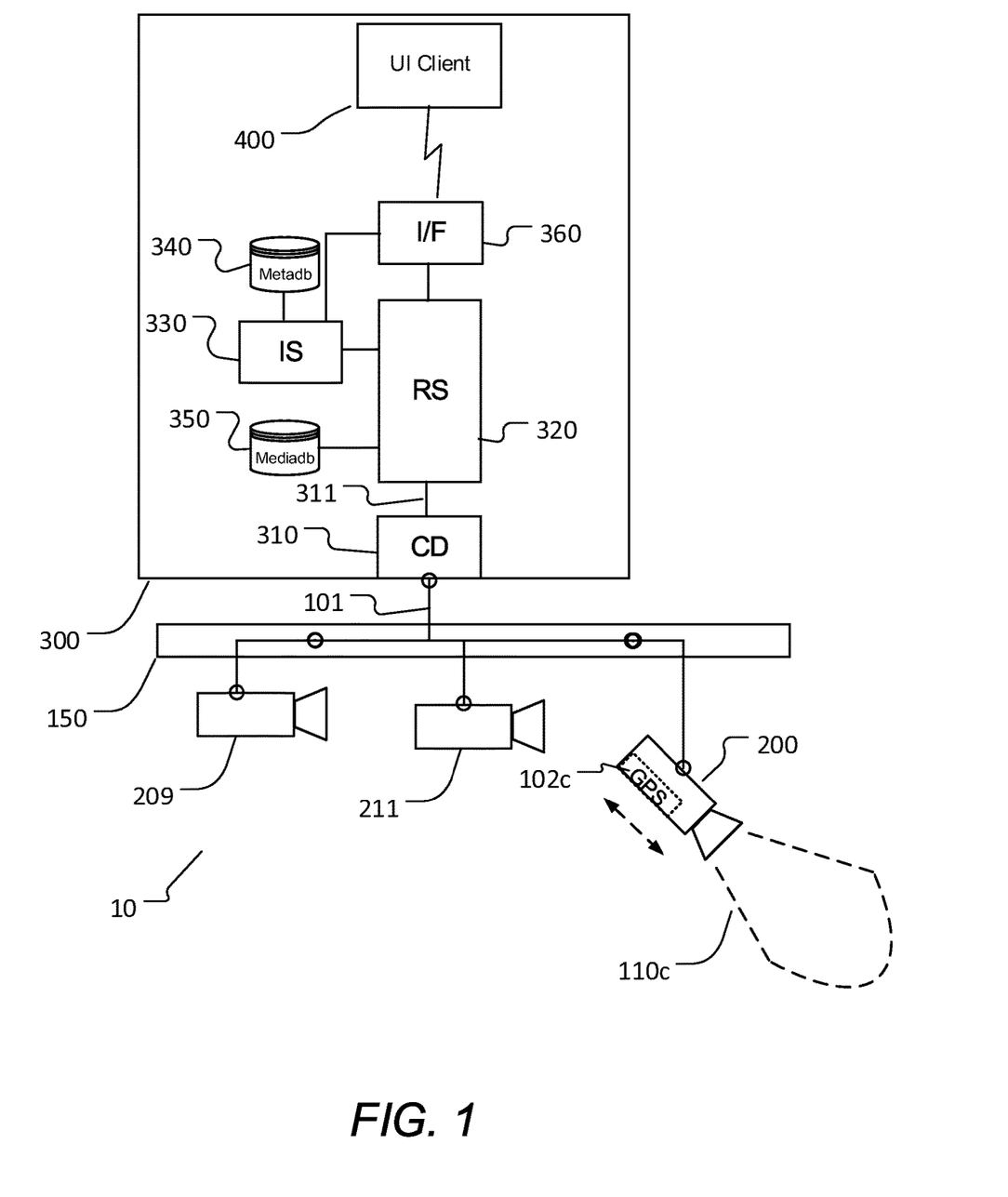
FIG. 1 is a schematic block diagram of an exemplary video surveillance system in accordance with some embodiments of the present disclosure.

FIG. 1 is a schematic block diagram of an exemplary video surveillance system 10. The video surveillance system 10 comprises a plurality of video cameras 209, 211, 200 communicatively connected to a video management system (VMS) 300 via respective wired or wireless communication links or connections 150.

Some embodiments of the video surveillance system 10 may comprise a mix of movable video cameras and stationary video cameras for example at least one movable video camera 200 and a plurality of stationary video cameras 209, 211 such as more than 10 stationary video cameras or more than 20 stationary video cameras. The plurality of stationary video cameras 209, 211 are typically distributed across a predetermined area or space where surveillance is desired. The number and position/location of the stationary video cameras 209, 211 of the video surveillance system 10 as well as the type of video camera comprised therein may be selected based on factors such as a level of surveillance desired, a size of the surveillance area or facility and/or the complexity of the layout of the surveillance area or facility. Each of the stationary video cameras 209, 211 may provide surveillance in a particular geographical zone, or sub-section, of the surveillance area. The movable video camera(s) 200 has a Field of view (FOV) and the stationary video cameras 209, 211 have respective FOVs (not shown). The FOV is the open, observable area of the camera in question as schematically illustrated by a pie-shaped outline 110c. The skilled person will appreciate that different types of video cameras may have different FOVs for example caused by different optical properties of camera lenses.

In the present specification, the term "movable" as a property of a video camera means the camera can be moved, i.e. is geographically dynamic, while carrying out video recording and/or live video streaming. The video recording and/or live video streaming is often carried out during active operation of the video surveillance system 10. The movable video camera is for example displaced along a certain path or trail of the surveillance area. A stationary video camera is typically fixed to a stationary structure, like a building wall or a pole in the surveillance area.

The movable video camera 200 may travel along a path or trail of the surveillance area via mounting to any suitable support structure of various types of vehicles for example motorized vehicles like cars, trucks, busses, trains, motorcycles, drones etc. The movable video camera 200 may be moved along the path or trail of the surveillance area by being mounted on, or worn by, a person via a suitable support like a belt etc. The person may for example be a police officer, bus driver, fireman etc. In the latter situation the movable video camera 200 travels through the surveillance area when the person walks or runs. Alternatively, the movable video camera 200 may be transported or moved via the vehicle's travel when the person wearing the movable video camera 200 is a driver or passenger of the vehicle. The stationary video cameras 209, 211 may be mounted on, or fixed to, various kinds of stationary structures like factory or office buildings, train stations, support structures arranged at traffic roads or junctions etc.

The movable video camera(s) may be conventional portable video camera(s) known as such in the art of video surveillance. It will be appreciated that the video surveillance system 10 typically includes a plurality of movable video cameras of the same type and/or different types. Different types of movable video cameras of the video surveillance system 10 may for example be tailored to specific operation schemes and placements, e.g. fixed to a truck or on-person fixations. The movable video cameras of different types may be configured to supply video streams of different resolution, in different formats or outputting additional metadata associated with the video stream. Examples of functions of the movable video cameras may include one or more of the following: video streaming, in particular live streaming, and/or video recording and audio streaming and/or audio recording. The video streaming and/or video recording may be carried out in visible wavelength ranges and/or in infrared wavelength ranges, such as near-infrared wavelength ranges. The moveable video camera(s) and stationary video cameras may comprise various control functions such as pan and/or zoom, image processing capabilities, motion detection, etc.

The respective video streams supplied by the stationary video cameras 209, 211 as well as those of the one or more movable video cameras 200 are associated with metadata streams. The metadata stream may be a separate stream from the associated video stream but originating from either the same video camera or another device mounted on the same person or vehicle as the video camera. The metadata stream associated with each video stream preferably includes time stamps together with corresponding position data associated with the video camera in question. This property allows time synchronization of the video streams and metadata streams at the VMS. The respective geolocations of the stationary video cameras 209, 211 and those of the one or more movable video cameras 200 may be derived from the position data supplied by a camera associated GPS unit or device. The associated GPS unit or device of a movable or stationary video camera may be built into the video camera as schematically illustrated by GPS device 102c of the movable video camera 200, or may fixed to a vehicle or person carrying the movable video camera in question.

The stationary video cameras 209, 211 as well as the one or more movable video cameras 200 are often communicatively connected to the video management system (VMS) 300 as mentioned above for example connected via a local area network 150 or in any other suitable manner, e.g. via point-to-point wired and/or wireless connections, or the like. For example, the stationary video cameras 209, 211 may be connected to the VMS via an Ethernet connection. The one or more movable video cameras 200 may often be wirelessly connected to the VMS 300 for example through a wireless network like Wi-Fi, a 4G and/or 5G network. However, one or more movable video cameras 200 may alternatively be configured to record the video stream during active operation where the video camera moves in or through the surveillance area. In the latter scenario, the recorded video stream may be transferred to, or off-loaded at, a media repository 350 of the VMS 300 at the time of return to an associated station. In the latter use case, the video stream may be offloaded at regular time intervals for example when a camera user or cameral vehicle such as a bus driver or police officer returns to the station.

The skilled person will understand that some exemplary video surveillance systems may include additional sensors providing sensor signals and/or media streams different from video streams, such as audio signals, radar signals, Lidar signals, etc.

The VMS 300 is preferably configured to store the received video streams in the media repository 350. The VMS 300 provides an interface 360 for accessing live video streams as well as the previously discussed added metadata, and to access video streams with respective metadata stored in the media repository 350. The interface 360 may implement different types of interfaces. For example, the interface may provide an application interface, e.g. in the form of a software development kit and/or one or more communication protocols, such as a suitable messaging protocol, e.g. SOAP, XML, etc. Accordingly, the interface may operate as a gateway to different types of systems. The VMS may be configured to implement various types of processing of received live video streams and/or recorded and retrieved video streams for example object detection, object recognition, motion detection etc.

The media repository 350 may comprise a media database or other suitable storage device for storing media content. The VMS 300 may include a user interface client (UI client) 400, for example configured to provide a user interface window (500 shown on FIG. 3), displayed on a suitable user screen or screens of the VMS 300. The user interface window 500 enables VMS users to see live video streams and/or stored and retrieved video streams and/or to control operation of one or more of the stationary video cameras 209, 211 and/or control operation of the one or more movable video cameras 200. The content and structure of data items displayed through the user interface may be configurable by the operator via control buttons etc. The user interface comprises a map component integrated in VMS. The map component is utilized to build or provide a geo-map of at least a part of the surveillance area, for example a geographical zone, subsection of the surveillance area, for presentation on the user screen via the user interface window 500. The map component may be configured to present a geo-map overview of the respective positions of the plurality of video cameras.

The VMS 300 may be embodied as one or more software program(s) comprising respective computer executable instructions configured for execution on a suitable data processing system, e.g. by one or more server computers. The data processing system implementing the VMS is typically arranged remote from the one or more movable video cameras 200 as the latter often travel over a large geographical area for example through a route or trail comprising various streets, roads and facilities. The route or trail may cover a city neighbourhood or even an entire city. The video streams from the movable video camera(s) may be transmitted to the VMS 300 over wireless public or other wireless communications networks. Alternatively, the movable video camera(s) 200 of the video surveillance system 10 may move in relative proximity to a locally arranged on-site VMS 300 for example in a manufacturing facility, residential or office buildings, shopping centre etc.

The VMS 300 may comprise one or more camera drivers 310 for providing interfaces to respective types of stationary and movable video cameras. Different types of these video cameras may provide their respective video streams in different formats, e.g. using different encoding schemes and/or different network protocols. Similarly, different cameras may provide different interfaces for camera control such as zoom or pan. Accordingly, the VMS 300 may include a plurality of different camera drivers 310 configured to cooperate with respective camera types. In particular, the camera drivers 310 may implement one or more suitable network protocols and/or other communications standards for transmitting data between movable and stationary video cameras and/or other peripheral devices and data processing systems. Examples of such protocols and standards include the Open Network Video Interface Forum (ONVIF) standard and the Real Time Streaming Protocol (RTSP).

The camera drivers 310 may further configured to add one time stamp to each frame of the received video streams 101 so as to ensure that the video streams, which are stored and subsequently supplied by the VMS 300, include a uniform time stamp. The added time stamp will also be referred to as a canonical time stamp. The canonical time stamp is indicative of the time of receipt, by the VMS 300, of the respective video streams from the respective stationary and movable video cameras. The camera drivers thus provide uniformly time-stamped input video streams each time-stamped input video stream 311 corresponding to a respective one of the received video streams.

The VMS 300 comprises a recording server 320. The recording server may be embodied as a software program module executed by a suitable data processing system, e.g. by one or more server computers. The recording server receives the inputted video streams 311 originating from the respective stationary and movable video cameras through the corresponding camera drivers 310. The recording server stores the received inputted video streams in a suitable media storage device, such as a suitable media database. It will be appreciated that the media repository 350 may be part of the VMS 300 or it may be separate from, but communicatively coupled to the VMS. The media repository 350 may be implemented as any suitable mass storage device, such as one or more hard disks or the like. The storing of the received video streams is also referred to as recording the received video streams. The recording server may receive and store additional data associated with received video streams such as the previously discussed metadata stream.

The VMS 300 may store the generated metadata in a suitable metadata repository 340, such as a suitable metadata database, which may be separate from, or integrated into, the media repository 350. To this end, the VMS 300 may include an index server 330. The index server 330 may be embodied as a software program module executed by a suitable data processing system, e.g. by one or more server computers. The index server may receive metadata and store the received metadata in the metadata repository 340. The index server may further index the stored metadata so as to allow faster subsequent search and retrieval of stored metadata. During searches through the stored video and metadata streams the metadata repository 340 may be accessed through the interface 360 and index server 330. The UI client 400 may query the index server 330 through the interface 360 and return matching search results. The UI client 400 may be configured to respond to receipt of the matching search results by determining the corresponding position data of the metadata stream in question. The UI client 400 may be configured to utilize the time stamps of the metadata stream in question to find the positions on the geo-map that correspond to the matching search results.

Figure 2:
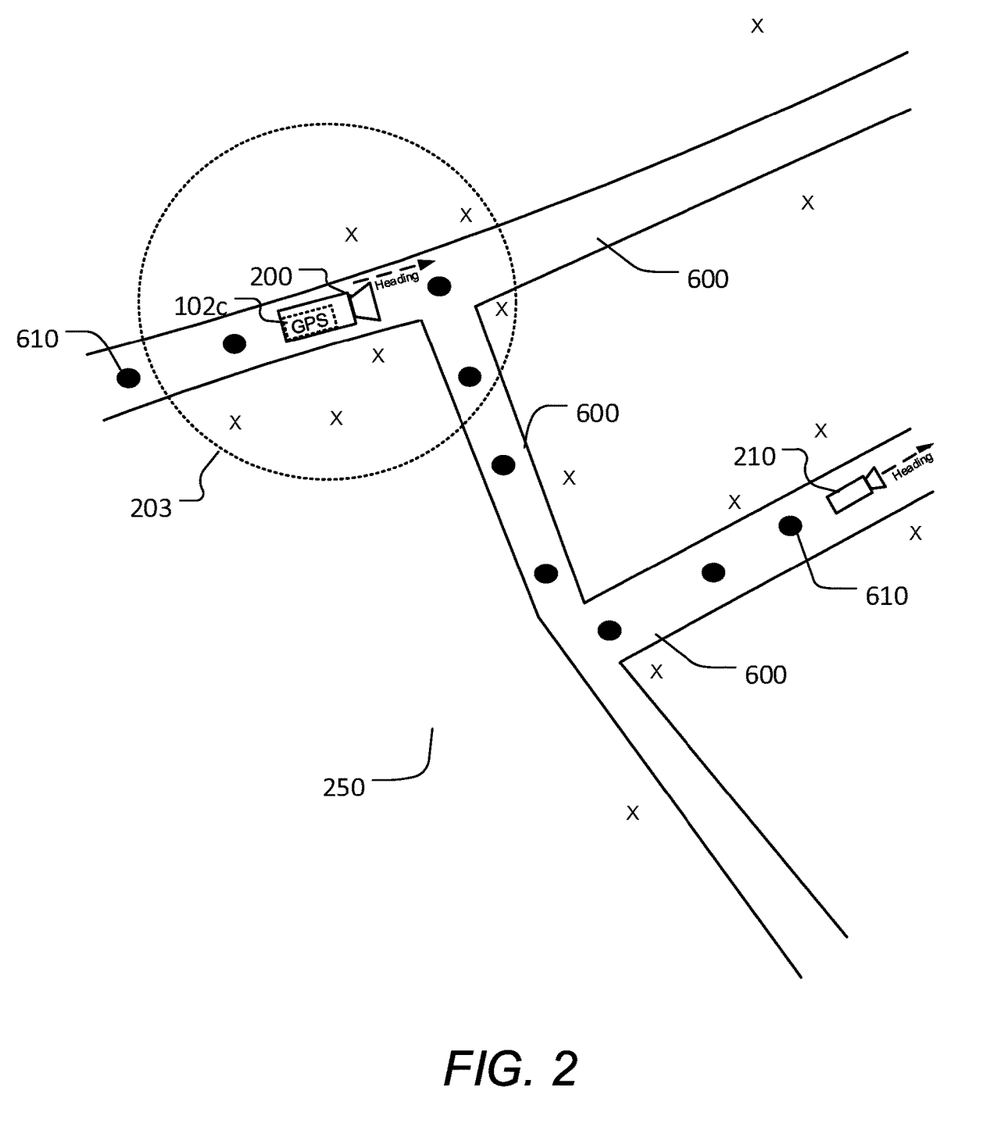
FIG. 2 illustrates in schematic form a geo-map of a surveillance area comprising a plurality of video cameras of the video surveillance system.

FIG. 2 illustrates a geo-map 250 of a surveillance area of the video surveillance system 10 in schematic form. The surveillance area includes a number of city streets 600 and road intersections. The video surveillance system 10 comprises two movable video cameras 200, 210 arranged within the surveillance area at a particular time instant of interest. Each of the movable video cameras 200, 210 may comprise a built-in GPS device 102c to detect or estimate a current position of the movable video camera in question at a particular time instant. Alternatively, each or both of the movable video cameras 200, 210 may have an associated GPS device, e.g. a GPS device fixed to a car or person carrying respective ones of the movable video camera 200, 210, for detecting the current respective positions of the video cameras. In either case, time stamps and corresponding position data supplied by the GPS device are added to, or embedded in, the respective metadata streams if not already included in the streams.

The video surveillance system 10 further comprises a plurality of stationary video cameras, for example more than 20 cameras, marked by "x" in the geo-map 250 for simplicity. The surveillance area is an example of a so-called camera-rich environment where a plurality stationary video cameras, "x", may be positioned in certain geographical zones of the surveillance area for example nearby roads or building structures of potential interest. An exemplary zone 203 of the surveillance area is defined by a distance limit measured from the movable video camera 200 as schematically illustrated. The distance limit defines a subset of nearby stationary video cameras 209, 211, 213, 215, 217, 219 (shown in FIG. 3) arranged inside the zone 203. This subset of nearby stationary video cameras is taken from the total number of video cameras in the surveillance area as marked by "x" in FIG. 2. The size of the zone 203 and hence the subset of nearby stationary video cameras 209, 211, 213, 215, 217, 219 (shown in FIG. 3) may be selected by the processing unit of the VMS 300 for example manually by a distance limit entered by the VMS operator. The distance limit, at the time instant in question, may be less than 100 m such as less than 50 m or 25 m, for example between 20 m and 5 m. The movable video camera 210 is outside the zone 203 at the time instant in question.

Figure 3:
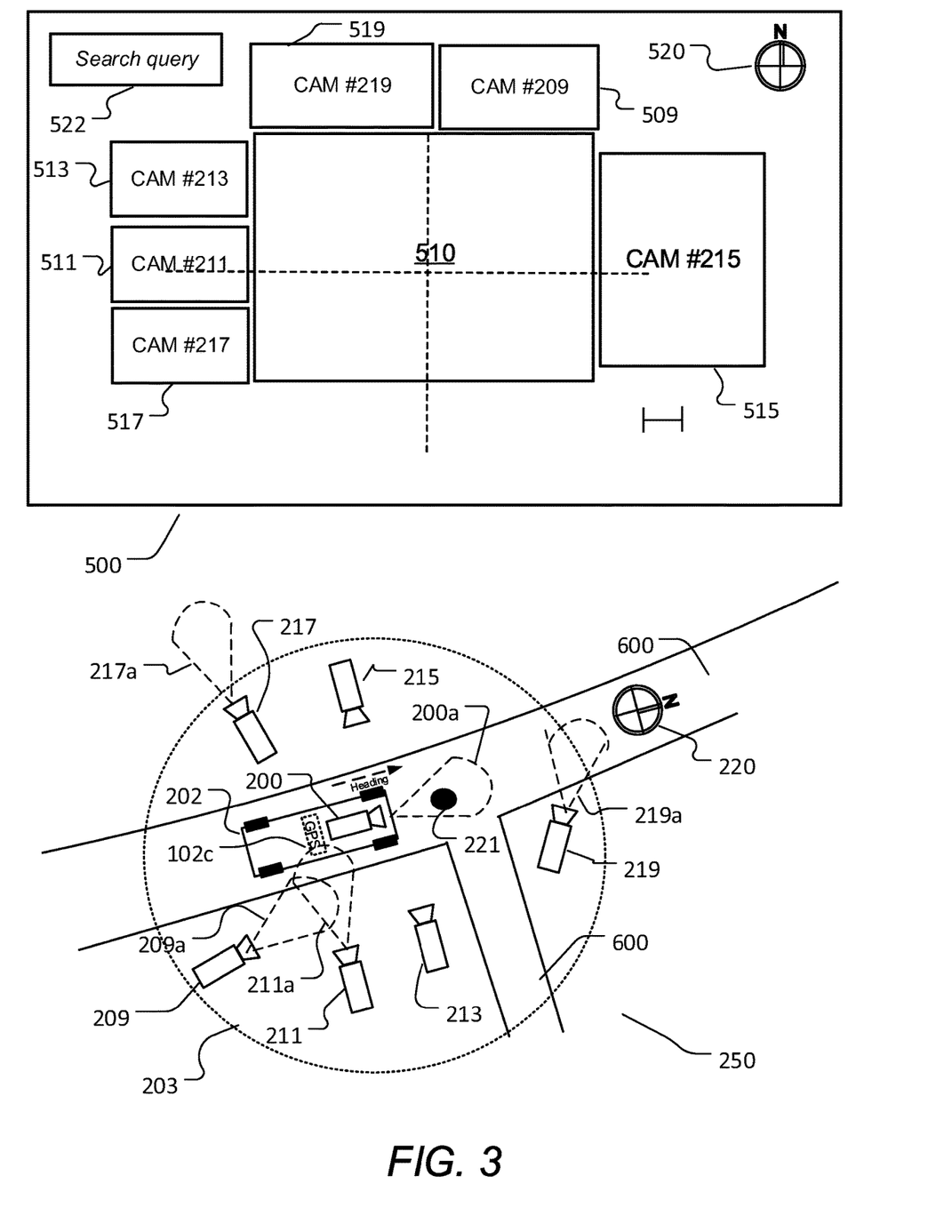
FIG. 3 illustrates on the upper section an exemplary schematic user interface window of a first embodiment of a video management system as displayed on a UI client.

The lowermost section of FIG. 3 illustrates an enlarged view of the surveillance area depicted on FIG. 2 centred at the zone 203 and taken at a particular time instant of interest. The uppermost section of FIG. 3 shows an exemplary user interface window 500 of the VMS 300 of the video surveillance system 10 of FIG. 1 in schematic form. The exemplary user interface window 500 may be displayed via a suitable screen or display of the UI client 400. The user interface window 500 may be presented to an operator or user of the VMS 300.

The moveable video camera 200 is mounted to a suitable support structure of an exemplary vehicle 202 for example motorized vehicles like cars, trucks, busses, trains, motorcycles etc. The movable video camera 200 may alternatively be moved or transported along the path or trail of the zone 203 by way of mounting on, or worn by, a person via a suitable support like a belt etc. The movable video camera 200 has a travel direction, or heading, e.g. north, along the road section 600 as schematically indicated by the compass 220.

For simplicity, a FOV 200a of the movable video camera 200 aims substantially in its direction of travel or heading, i.e. northern as indicated. The plurality of stationary video cameras 209, 211, 213, 215, 217, 219 of the subset may be mounted on, or fixed to, various kinds of stationary structures like factory or office buildings, train stations, support structures arranged at traffic roads or junctions etc. The distance limit may be based on parameters like respective FOVs of the stationary video cameras 209, 211, 213, 215, 217, 219, environmental light conditions etc.

The skilled person will understand that the surveillance system may comprise one or more additional movable video cameras inside the zone 203 at the time instant with respective FOV aims. In that situation the movable video camera 200 can be considered the primary movable camera. The latter is in that situation mapped to the primary tile 510.

Inside the zone 203, a first video camera 209 is arranged with a largely forward aiming, i.e. northern using the depicted exemplary geographical layout, of its FOV 209a relative to the FOV 200a of the movable video camera 200. The latter is mounted to its associated vehicle 202.

Inside the zone 203, a second video camera 211 is arranged with substantially left aiming, i.e. western using the depicted exemplary geographical layout, of its FOV (not shown) relative to the FOV 200a of the movable video camera 200.

A third stationary video camera 213 is arranged with a similar substantially left aiming, i.e. western using the depicted exemplary geographical layout, aim of its FOV (not shown) relative to the aim of FOV 200a of the movable video camera 200 even though the video camera 213 is geographically positioned further towards to a frontal part of the vehicle 202.

A fourth stationary video camera 215 is arranged with a right aiming, i.e. eastern using the depicted exemplary geographical layout, of its FOV (not shown) relative to the aiming of FOV 200a of the movable video camera 200.

A fifth stationary video camera 217 is arranged with a substantially left, or western, aiming of its FOV 217a relative to the aiming of the FOV 200a of the movable video camera 200 similarly to the aiming of the respective FOVs of the stationary video cameras 211, 213 despite the fifth stationary video camera 217 is geographically positioned on the opposite side of the movable video camera 200.

A sixth video camera 219 is arranged with a largely forward aiming, i.e. northern using the depicted exemplary geographical layout, of its FOV 219a relative to the aiming of the FOV 200a of the movable video camera 200. That is similarly to the FOV 209a of the stationary video camera 209 albeit geographically located in front of the movable video camera 200 instead of behind. Furthermore, the relative aiming of FOV 219a and FOV 200a, is more northwest, using the depicted exemplary geographical layout, than the relative aims of the FOVs 200a and 209a of the first stationary video camera 209. The latter has a largely forward aiming, i.e. northern, of its FOV 209a. Accordingly, the secondary tile 519 that reflects the FOV aim 219a of the sixth stationary video camera 219 is positioned at the left of, and above, the primary tile 510 in the user interface window (UIW) 500. In a similar manner the position of the secondary tile 509 reflects the more northern aim of the FOV 209a of the first stationary video camera 209 compared to the FOV aim 219a of the sixth stationary video camera 219.

Therefore, the secondary tile 509 is positioned at the right of, and above, the primary tile 510.

The corresponding UIW 500, such as a window of a graphical user interface, is configured to show multiple video streams in respective tiles of the interface using an innovative layout. The latter layout is configured such that the selected position of each secondary tile relative to the primary tile on (UIW) 500 reflects a relative aiming of the fields of view of the corresponding stationary, or possibly movable, video camera and the movable video camera as outlined above. The layout of the UIW 500 creates an immersive environment for the user to improve the user's awareness of target objects and/or incidents of interest at specific locations in the surroundings of the movable video camera at the time instant and/or time periods before and after the time instant.

More specifically, the exemplary UIW 500 comprises the primary tile 510 that is configured to present a video stream supplied by the movable video camera 200 at the position and time instant in question as illustrated on FIG. 3. The video stream supplied by the movable video camera 200 may be a live stream or a stream retrieved from the earlier discussed repository. The position and time of the movable video camera 200, and thereby of the associated GPS unit 102c and vehicle 202, may be determined by the processing unit of the VMS 300 using the metadata stream associated with the movable video camera 200 as discussed above. The heading of the vehicle 202 is straight north through the surveillance area and through the zone 203 as schematically indicated by compass 220. The FOV 200a aims or points in the substantially same direction as the heading of the movable camera 200 which is a common situation, but alternative aims exist.

The skilled person will understand that the layout of the user interface window (UIW) 500 in this manner reflects relative aims of the FOVs of a particular movable video camera like camera 200, i.e. the primary camera in the present embodiment, and the stationary or movable camera in question.

The position and time instant, or time period, of the movable video camera 200 for video stream presentation may be defined by a result of a particular search query entered into the processing unit of the VMS 300 by the operator for example via a search window or box 522 of the UIW 500. The search query may be applied to live video streams, i.e. real-time, or may be applied to stored and retrieved video streams. The search query aims at identifying a particular object or incident, say a target object like a red sedan car, a dog, a person with certain characteristics, in the zone 203 and within a specified time period or time span. In the present example, the target object is depicted by dot 221 for simplicity. The target object is arranged in a FOV of the movable video camera 200 at the time instant and therefore generates a search hit or search result in the corresponding video stream. The processing unit of the VMS 300 proceeds by displaying the respective video streams of the subset of the stationary video cameras 209, 211, 213, 215, 217, 219 that are positioned inside the zone 203. The video streams of the subset of the stationary video cameras 209, 211, 213, 215, 217, 219 are displayed in respective secondary tiles 509, 511, 513, 515, 517, 519 of the user interface window 500. The secondary tiles 509, 511, 513, 515, 517, 519 are generally positioned around the primary tile 510 and may fully or merely partly surround the primary tile 510 depending on respective aimings of the stationary video cameras 209, 211, 213, 215, 217, 219. The skilled person will understand that UIW 500 is an exemplary embodiment where the primary tile 510 is rectangular and placed at a center while the secondary tiles 509, 511, 513, 515, 517, 519 fully surround the rectangular primary tile 510 on all sides. The center of the UIW 500 may be positioned at the center of the user screen of the UI client 400.

In alternative embodiments a plurality of secondary tiles may positioned along one, two, three or four sides of a rectangular primary tile as discussed in further detail below with reference to FIG. 4.

The skilled person will appreciate that the position of each of the secondary tiles 509, 511, 513, 515, 517, 519 relative to the primary tile 510 in the UIW 500 reflects a relative aiming of the fields of view of the corresponding stationary video camera and the movable video camera as outlined above. More specifically, the processing unit of the VMS is configured to display the video stream of the first stationary video camera 209 in the first secondary tile 509. The first secondary tile 509 is arranged above the primary tile 510 in preferably a non-overlapping layout of these tiles. The layout reflects the largely forward aiming, or aiming, of the FOV 209a of the first stationary video camera 209 relative to the FOV 200a of the movable video camera 200 at the time instant.

The processing unit of the VMS is further configured to display the video stream of the second stationary video camera 209 in a second secondary tile 511. The second secondary tile 511 is arranged to a left of the primary tile 510 in a non-overlapping layout of these tiles. The layout reflects the largely left aiming of the FOV 211a of the second stationary video camera 211 relative to the FOV 200a of the movable video camera 200 at the time instant.

The processing unit of the VMS is further configured to display the video stream of the third stationary video camera 213 in a third secondary tile 513. The third secondary tile 513 is arranged to the left of the primary tile 510 in a non-overlapping layout of these tiles. The layout reflects the largely left aiming, or aiming, of the FOV (not shown) of the third stationary video camera 213 relative to the FOV 200a of the movable video camera 200 at the time instant.

The processing unit of the VMS is further configured to display the video stream of the fourth stationary video camera 215 in a fourth secondary tile 515. The fourth secondary tile 515 is arranged at the right of the primary tile 510 in a non-overlapping layout of these tiles. The layout reflects the largely right aiming, or aiming, of the FOV (not shown) of the fourth stationary video camera 215 relative to the FOV 200a of the movable video camera 200 at the time instant. A height of the fourth secondary tile 515 is preferably about equal to the height of the primary tile 510, since there are no further tiles arranged on the right side of the primary tile 510 because there are not any further stationary video cameras with this aiming positioned inside the zone 203.

The processing unit of the VMS is further configured to display the video stream of the fifth stationary video camera 217 in a fifth tile 517. The fifth secondary tile 517 is arranged at the left of the primary tile 510 in a non-overlapping layout of these tiles. The relative positions of the tiles 510, 517 in the UIW 500 reflect the largely right orientation, or aiming, of the FOV (not shown) of the fourth stationary video camera 215 relative to the FOV 200a of the movable video camera 200 at the time instant.

The processing unit of the VMS is configured to display the video stream of the sixth stationary video camera 219 in a sixth secondary tile 519. The sixth secondary tile 519 is arranged above the primary tile 510 in a non-overlapping layout of these tiles. The relative positions of the tiles 510, 519 in the UIW 500 reflect the largely forward orientation, or aiming, of the FOV 219a of the sixth stationary video camera 219 relative to the FOV 200a of the movable video camera 200 at the time instant.

The respective sizes of the first to sixth tiles are preferably adapted to the size, height or length of the corresponding side of the first tile to provide a large viewing area of each of the secondary tile.

The processing unit may design or layout the UIW 500 so as to make a visual distinction of the primary tile 510 and each of the secondary tiles 509, 511, 513, 515, 517, 519 by adding one or more visually distinguishing attributes to the primary tile and/or add one or more visually distinguishing attributes to one or more of the secondary tiles. These attributes may comprise at least one of a color, such as coloured borders, relative sizes, textual tags and icons.

The skilled person will appreciate that the number of secondary tiles on each side of the primary tile 510 may be fixed or may be dynamically adapted in the UIW 500 by the processing unit depending on the number of, and positions of, the subset of nearby stationary video cameras 209, 211, 213, 215, 217, 219. The skilled person will appreciate that the respective form factors and sizes of the secondary tiles 509, 511, 513, 515, 517, 519 of the user interface window 500 may vary from the schematically illustrated form factors and sizes on FIG. 3. However, certain size and form factor constraints exist to make the respective video streams optimally viewable and intuitive for the user. If there are more nearby arranged stationary video cameras than the number of available secondary tiles, the processing unit may reduce the number of stationary video cameras of the subset for example by excluding those stationary cameras with the longest distances to the movable video camera at the time instant. In some embodiments, the number of tiles on each side of the primary tile may be restricted to a maximum of 4 or 3.

More specifically, for the exemplary UIW embodiment 500, the first secondary tile 509 is arranged below the primary tile 510 so as to reflect the position of the corresponding nearby located stationary video camera 209 behind the movable video camera. The processing unit is configured to present the corresponding video stream supplied by video camera 209 in the first secondary tile 509 to the VMS operator via the UIW 500. A width of the first secondary tile 509 may, as schematically illustrated, be set largely equal to that of the primary tile 510 in the UIW 500 by the processing unit of the VMS 300. A substantially equal width of the first secondary tile 509 and primary tile 510 may be advantageous to maximize the viewing area of the first secondary tile 509 when, as in the present example, only a single stationary video camera 209 is positioned behind the movable video camera 200.

A second secondary tile 511 is arranged adjacent to, and non-overlapping with, the lower right side of the primary tile 510 so as to reflect the position of the corresponding stationary video camera 209 at the time instant in question. The latter is positioned behind the movable video camera 200. A height of the second secondary tile 511 is chosen by the processing unit of the VMS 300 to about one-half of the height of the primary tile 510 to make adequate room for two, preferably non-overlapping, secondary tiles 511, 513 to the right of the primary tile 510. The two secondary tiles 511, 513 show respective video streams of the two nearby positioned stationary video cameras 211, 213 at the right of the movable video camera 200 at the time instant, and possibly time periods before and after, so as to reflect their respective relative geographical positions to the movable video camera 200 as defined by the northern heading 220 of the movable video camera 200.

A fourth secondary tile 515 is arranged adjacent to, and non-overlapping with, the right side of the primary tile 510 so as to reflect the left aim, i.e. eastern aim, of the FOV of the corresponding stationary video camera 215 relative to the aim of the FOV 200a of movable video camera 200 in a similar manner as discussed above. A height of the fourth secondary tile 515 is set to largely the height of the primary tile 510. The fourth secondary tile 515 shows the video stream of the nearby positioned stationary video camera 215 at the time instant and possibly time periods before and after.

A fifth secondary tile 517 is arranged adjacent to, and non-overlapping with, the lower portion of the left side of the primary tile 510 so as to reflect the largely left aim of the FOV 217a of the corresponding stationary video camera 217 relative to the aim of the movable video camera 200 in a similar manner as discussed above. A height of the fifth secondary tile 517 is preferably set to about one-third of the height of the primary tile 510 to make adequate room for three, preferably non-overlapping, secondary tiles 511, 513, 517 at the left of the primary tile 510. The sixth secondary tile 519 is arranged adjacent to, and non-overlapping with, the upper boundary or side of the primary tile 510 on its leftmost part so as to reflect the north-west aim of the FOV of corresponding stationary video camera 219 as discussed above. A width of sixth secondary tile 519 is preferably set to about one-half of the width of the primary tile 510 for the reasons discussed above. The fifth and sixth secondary tiles 517, 519 show respective video streams of the two nearby positioned stationary video cameras 217, 219 at the time instant, and possibly time periods before and after that instant.

Figure 4:
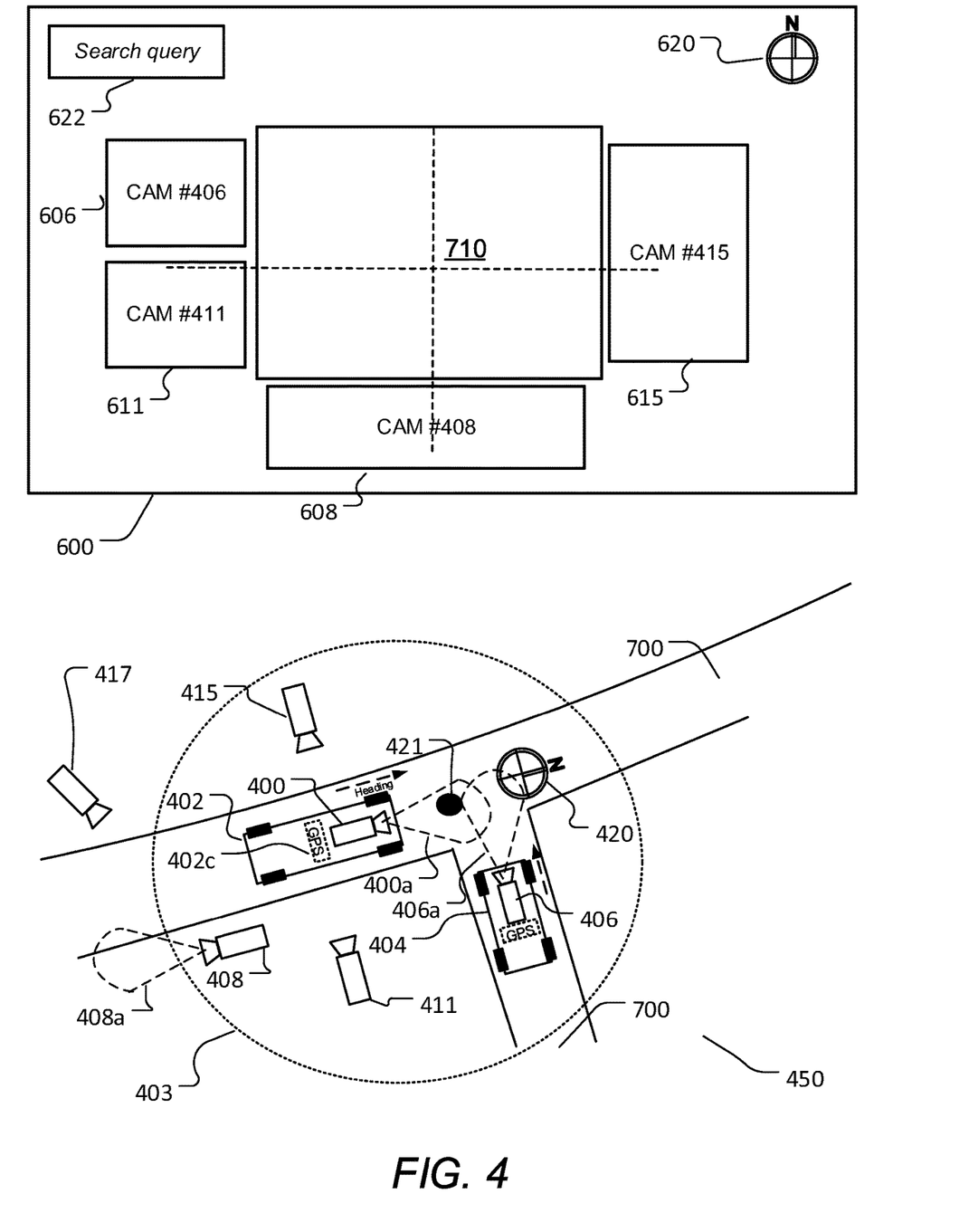
FIG. 4 illustrates on the upper section an exemplary schematic user interface window of a second embodiment of a video management system as displayed on the UI client.

FIG. 4 is a schematic illustration of a second embodiment of the video surveillance system 10 and VMS 300 of FIG. 1. Corresponding features of the first and second embodiments of the video surveillance system may be identical and possess identical properties and functions even though not described in detail in connection with the present second embodiment for brevity.

The present video surveillance system comprises at least two moveable video cameras 400, 406 and two stationary video cameras 411, 415 arranged at respective geo-positions of the geo-map 450. The moveable video camera 400 is the reference camera in the present exemplary embodiment. A further stationary video cameras 417 is arranged within the surveillance area, but outside the user defined, or automatically defined, geographical zone 403. The skilled person will appreciate that the size of the geographical zone 403 may be set by the VMS operator and therefore include fewer or additional video cameras than those illustrated without departing from the present embodiment. The two moveable video cameras 400, 406 may be mounted to respective vehicles 402, 404 and drive through the surveillance area and zone 403 as discussed above in connection with the movable video camera 200. The presence of two moveable video cameras 400, 406 makes the tracking of these by the processing unit more complex but provides additionally flexibility to get a better overview of the surveillance area at specific locations or geographical zones where the number of nearby stationary video cameras is limited. Current geo-positions of the two moveable video cameras 400, 406 at the time instant may be tracked, and possibly estimated, by the processing unit based on their respective metadata streams. The respective geo-positions of the two moveable video cameras 400, 406 are within the zone 403 at the time instant as illustrated. The two moveable video cameras 400, 406 will naturally often be positioned further away, or possibly closer to, each other as time goes by depending on the respective routes taken by the associated vehicles 402, 404. The vehicle 402 that carries the first moveable video camera 400 heads straight north through the surveillance area and zone 403 as schematically indicated by compass 420. The skilled person will appreciate that the processing unit of the VMS may be configured to dynamically track the geo-position of the movable video camera 400 by repeatedly determine its current geo-location and determine a corresponding zone 403. Hence, the subset of stationary video cameras and possible movable video cameras inside the geographical zone 403 will generally change along the route of the movable video camera 400.

The uppermost section of FIG. 4 shows an exemplary schematic user interface window (UIW) 700 generated and displayed by the VMS of the present video surveillance system. The exemplary user interface window 700 may be displayed on a suitable screen or display of the UI client 400. The user interface window (UIW) 700 is configured to show a video stream of the movable video camera 400 at the time instant, and possibly time periods before and after the time instant, in a primary tile 710. The (UIW) 700 is further configured to show respective video streams of the three stationary video cameras 408, 411, 415 in respective secondary tiles 608, 611, 615 using a UIW layout where the position of each of the secondary tiles 608, 611, 615 relative to the primary tile 510 reflects relative aiming of the fields of view of the corresponding stationary, or non-reference movable, video cameras and the movable reference video camera 400. The (UIW) 700 is further configured to show a video stream of the second moveable video camera 406 corresponding to the time instant, and possibly also time periods before and after the time instant, in the secondary tile 606. The secondary tile 606 is positioned at a left of the primary tile 710, preferably in a non-overlapping layout of these tiles, so as to reflect the largely left, i.e. western aiming, of the FOV 406a of the second moveable video camera 406 relative to the FOV 200a of the movable video camera 200 at the time instant.

The secondary tile 608 is positioned below the primary tile 710, preferably in a non-overlapping layout of these tiles, so as to reflect the largely backward aiming, of the FOV 408a of the stationary video camera 408 relative to the FOV 200a of the movable video camera 200 at the time instant. The secondary tiles 606, 608, 611 and 615 606 surround the rectangular primary tile 710 on three sides.

Figure 5:
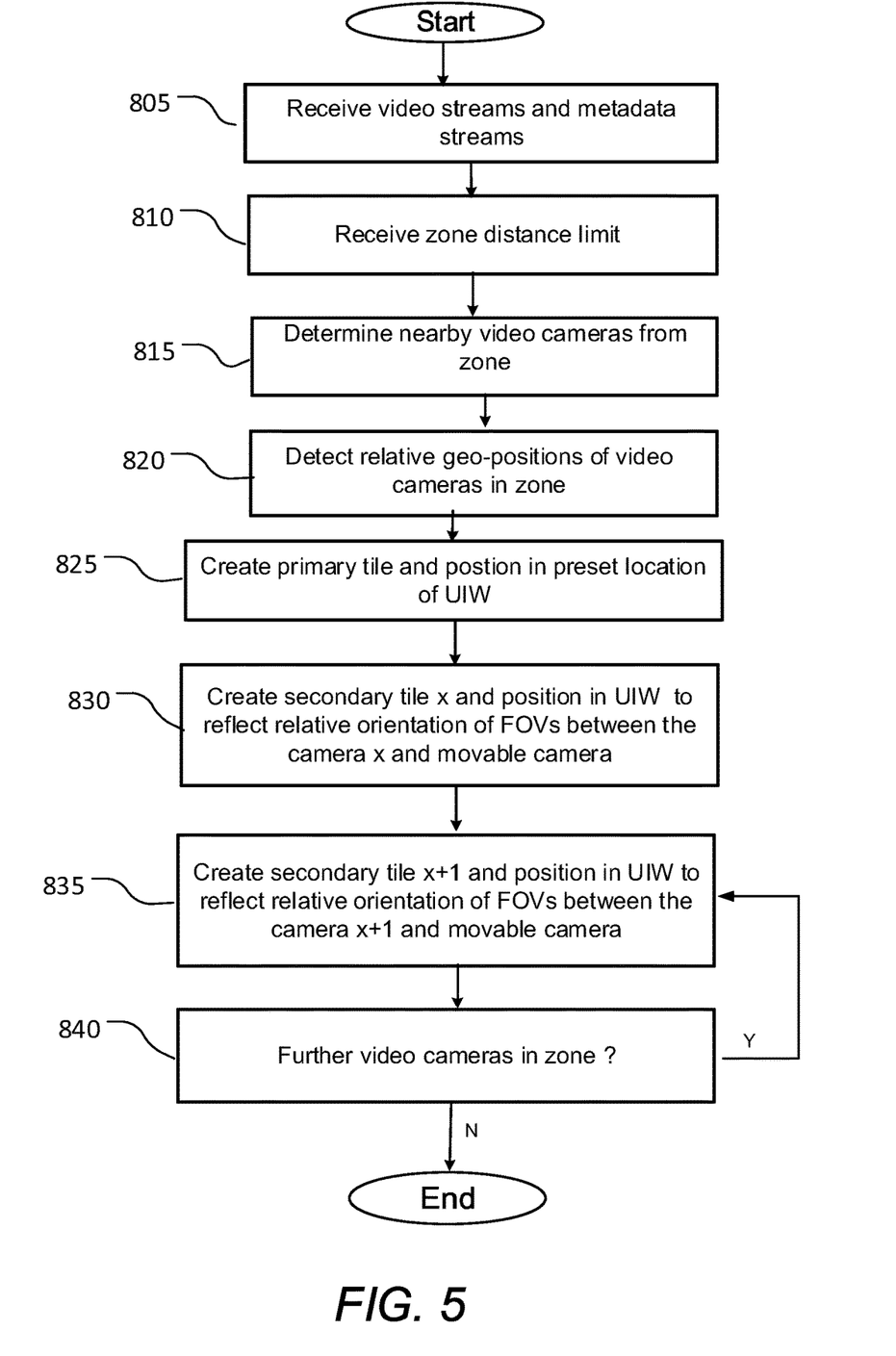
FIG. 5 shows a flow chart of an exemplary computer-implemented video management method that is suitable for the exemplary video surveillance systems disclosed herein.

FIG. 5 shows a flow chart or diagram of an exemplary computer-implemented video management method, suitable for the previously disclosed surveillance systems and video management systems (VMS).

In step 805, a processing unit of the VMS receives a plurality of video streams and associated metadata streams supplied by a plurality of stationary video cameras and a movable video camera.

In step 810 the processing unit receives e.g. a user defined distance limit that sets the outer boundary or perimeter and size of a geographical zone around the geo-position of at least one movable video camera at the time instant in question.

In step 815 the processing unit determines respective geo-positions of the plurality of stationary video cameras for example using a geo-map database. The respective positions of the plurality of stationary video cameras may be determined from the associated metadata streams or may be determined by pre-stored knowledge of these positions in the processing unit. The processing unit thereafter determines a subset of nearby stationary video cameras to the movable video camera, from the plurality of stationary video cameras in the surveillance area, at the time instant in question. In this context "nearby" means a distance, as set by the zone distance limit, between the movable video camera and the stationary video camera in question, at the time instant, of less than 100 m such as less than 50 m or 25 m, for example between 25 m and 5 m.

In step 820 the processing unit determines a geographical position or geo-position of the movable video camera and respective relative geo-positions of the subset of stationary video cameras.

In step 825 the processing unit creates a primary tile in a UIW of the VMS for example a UIW displayed on a user screen of the VMS such as a screen of a local or remote client computer. The primary tile may be rectangular and positioned at a center of the UIW. The processing unit presents a video stream of the movable video camera corresponding to the time instant, and possibly time periods before and after the time instant, in the primary tile.

In step 830 the processing unit creates a first secondary tile in the UIW of the VMS and arranges the first secondary tile at a position in the UIW relative to the position of the primary tile that reflects a relative aiming of the fields of view of the corresponding stationary video camera and the movable video camera.

In step 835 the processing unit creates a second secondary tile in the UIW and arranges the second secondary tile at a position in the UIW relative to the position of the primary tile that reflects a relative aiming of the fields of view of the corresponding stationary video camera and the movable video camera In step 840 the processing unit checks whether there are further stationary video camera(s), or possibly a second movable stationary video camera, positioned inside the geographical zone at the time instant. If yes, the processing unit jumps back to step 835 and generates a further secondary tile using the UIW layout principles discussed above in connection with FIG. 3. The processing unit presents a video stream of the further stationary video camera corresponding to the time instant in the further secondary tile. The processing unit proceeds by repeating steps 835-840 until all video cameras inside zone are positioned in appropriate tiles around the primary tile so that their respective video streams are presented at the appropriate positions of the UIW.

While the present disclosure has been described with reference to embodiments, it is to be understood that the present disclosure is not limited to the disclosed embodiments. The present disclosure can be implemented in various forms without departing from the principal features of the present disclosure as defined by the claims. Such variations may derive, in particular, from combining aspects of the present disclosure as set forth in the above disclosure and/or in the appended claims.

Each feature disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The word "comprising" does not necessarily exclude other elements or steps, and the indefinite article "a" or "an" does not necessarily exclude a plurality. A single processing unit or multiple processing units or other unit may fulfil the functions of several items recited in the claims. The mere fact that different features are recited in mutually different dependent claims does not indicate that a combination of these features cannot be advantageously used. Any reference signs in the claims should not be construed as limiting the scope of the disclosure.

In the preceding embodiments, the functions described may be implemented in hardware, software, firmware, or any combination thereof. If implemented in software, the functions may be stored on or transmitted over, as one or more instructions or code, a computer-readable medium and executed by a hardware-based processor or processing unit.

The invention claimed is:

1. A video surveillance system for improving a user's awareness of surroundings of a moveable video camera, the video surveillance system comprising:
   a movable video camera and a plurality of stationary video cameras arranged in a surveillance area and configured to generate respective video streams and respective associated metadata streams, wherein the movable video camera is geographically dynamic while recording or streaming video; and
   a video management system comprising:
   a processing unit configured to receive the respective video streams and associated metadata streams via a data communication interface,
   a user screen or display comprising a user interface window having a user interface window layout configured to present the respective video streams of the movable video camera in primary tile and the plurality of stationary video cameras in secondary tiles,
   wherein said processing unit is further configured to:
      determine a geographical position and a time instant of the movable video camera,
      determine respective geographical positions of the plurality of stationary video cameras,
      select a subset of stationary video cameras, from the plurality of stationary video cameras, arranged nearby the determined geographical position of the movable video camera at the time instant,
      present a video stream of the movable video camera corresponding to the time instant in the primary tile of the user interface window,
      present the respective video streams, at the time instant, of the subset of stationary video cameras in respective secondary tiles of the user interface window;
   wherein the position of each secondary tile relative to the primary tile reflects an aiming of the fields of view of the corresponding stationary video camera relative to the field of view of the movable video camera for improving the user's awareness of the surroundings of the movable video camera; and
   wherein the selected subset of stationary video cameras is updated based on a change of the geographical position of the movable camera, wherein the second tiles of the user interface window are updated based on the updated subset of stationary video cameras and the aiming of the fields of view of the corresponding updated subset of stationary video camera relative to the field of the view of the movable video camera.

2. The video surveillance system according to claim 1, wherein said processing unit is further configured to:
   position the primary tile at a center of the user interface window and position each secondary tile:
      above the primary tile when the field of view of the corresponding stationary video camera aims substantially in same direction as field of view of the movable video camera,
      below the primary tile when the field of view of the corresponding stationary video camera aims substantially in opposite direction of field of view of the movable video camera,
      at the left of the primary tile when the field of view of the corresponding stationary video camera aims substantially to the left of the field of view of the movable video camera,
      at the right of the primary tile when the field of view of the corresponding stationary video camera aims substantially to the right of the field of view of the movable video camera.

3. The video surveillance system according to claim 1, wherein said processing unit is further configured to:
   arrange each secondary tile of the plurality of secondary tiles adjacent to, and non-overlapping with the primary tile.

4. The video surveillance system according to claim 1, wherein said processing unit is further configured to:
   adjust the size of one or more secondary tiles arranged at a side of the primary tile to substantially extend along the length of the side.

5. The video surveillance system according to claim 1, wherein said processing unit is further configured to:
   select the subset of stationary video cameras based on at least one condition selected from:
      smallest distances to the movable video camera,
      video quality, and
      video resolution.

6. The video surveillance system according to claim 1, wherein said position and time instant of the movable video camera correspond to a search result which identifies at least one of a target object, a target activity and a target incident in the surveillance area in accordance with a user defined search query or an automatically generated search query.

7. The video surveillance system according to claim 1, wherein the processing unit is configured to:
   store the plurality of video streams and associated metadata streams in a video data repository and in a metadata repository, respectively; and
   retrieve the plurality of video streams and associated metadata streams.

8. The video surveillance system according to claim 1, wherein the processing unit is configured to
   add one or more visually distinguishing attributes to the primary tile relative to the secondary tiles wherein said attributes comprise at least one of a color, a size, textual tags and icons.

9. The video surveillance system according to claim 1, wherein a nearby stationary video camera is selected based on a distance to the movable video camera, at the time instant, of less than 100 m, preferably less than 50 m or 25 m, or more preferably between 20 m and 5 m.

10. A computer-implemented video management method for improving a user's awareness of surrounding of a movable video camera in a video surveillance system, comprising steps:
   a) receive, at a video management system, a plurality of respective video streams and associated metadata streams supplied by a movable video camera and a plurality of stationary video cameras, wherein the movable video camera is geographically dynamic while recording or streaming video,
   b) determine a time instant of the movable video camera and determine a corresponding geographical position of the movable video camera, c) determine respective geographical positions of the plurality of stationary video cameras, d) determine a subset of stationary video cameras, from the plurality of stationary video cameras, arranged nearby to the determined geographical position of the movable video camera at the time instant, e) generate a primary tile in a user interface window of a user screen and present a video stream of the movable video camera corresponding to the time instant in the primary tile, f) generate and position a secondary tile in the user interface window for each stationary video camera in the subset of stationary video cameras, wherein the position of each secondary tile relative to the primary tile reflects an aiming of the field of view of one stationary video camera of the subset of stationary video cameras relative to the field of view of the movable video camera for improving the user's awareness of the surroundings of the movable video camera, g) present a video stream of the first stationary video camera corresponding to the time instant in the first secondary tile, h) repeat steps f) and g) for each stationary video camera of the subset of stationary video cameras, wherein a user interface window layout comprises the primary tile and the or each secondary tiles, i) update the determined subset of stationary video cameras based on a change in geographical position of the movable camera, and wherein the secondary tiles are updated based on the updated subset of stationary video cameras and the aiming of the fields of view of the corresponding updated subset of stationary video camera relative to the field of view of the movable video camera.

11. The computer-implemented video management method for a video surveillance system according to claim 10, further comprising the step of:

j) receive, at the video management system, a user defined search query, or an automatically generated search query, for identifying at least one of a target object, a target activity and a target incident at a time instant and corresponding geographical position of the movable video camera.

12. A video management system comprising a processing unit storing a plurality of microprocessor executable program instructions configured to at least carry out steps a)-i) of the computer-implemented video management method of claim 10.

13. A video management system for improving a user's awareness of surrounding of a movable video camera, the video management system comprising one or more processors configured to execute computer readable instruction stored in a memory which, when run on a processor unit, are configured to:

a) determine a geographical position of a movable video camera within a surveillance area at a time instant based on received location data, wherein the movable camera is geographically dynamic within the surveillance area while recording or streaming;

b) select a subset of nearby stationary video cameras from a plurality of stationary video cameras within the surveillance area, wherein the geographical position of each of the stationary video cameras is determined based on location data and the subset of nearby cameras is selected based on a selection factor including proximity to the movable video camera at the time instant;

c) generate a user interface layout configuration for use in a user interface window on a device, the user interface layout configuration including a primary video tile for the movable camera and a secondary video tile for each stationary video camera within the determined subset of nearby stationary cameras, wherein the video tiles present video streams received from respective video cameras at the time instant, wherein the or each secondary video tile is position relative to the primary tile to reflect a relative aiming of the fields of view of the corresponding stationary video camera within the subset of nearby stationary cameras and the movable video camera for improving the user's awareness of the surroundings of the movable camera;

d) updating the subset of nearby stationary video cameras when the geographical position and time instant of the moveable camera changes; and e) updating the generated user interface layout configuration based on the updated subset of nearby stationary video cameras including updating the secondary tiles based on the updated subset of stationary video cameras and the aiming of the fields of view of the corresponding updated subset of stationary video camera relative to the field of view of the movable video camera.

* * * * *